(12) United States Patent
Sparkman et al.

(10) Patent No.: US 7,959,185 B2
(45) Date of Patent: Jun. 14, 2011

(54) INFLATOR BOTTLE FOR COMBUSTIBLE GAS MIXTURE

(75) Inventors: John Paul Sparkman, Dayton, OH (US); Charles M. Woods, West Manchester, OH (US); William H. Phipps, St Paris, OH (US)

(73) Assignee: Autoliv Development AB, Vararda (SE)

( * ) Notice: Subject to any disclaimer, the term of this patent is extended or adjusted under 35 U.S.C. 154(b) by 88 days.

(21) Appl. No.: 12/286,618

(22) Filed: Oct. 1, 2008

(65) Prior Publication Data

US 2010/0078922 A1   Apr. 1, 2010

(51) Int. Cl.
B60R 21/26 (2011.01)
(52) U.S. Cl. ........................................................ 280/741
(58) Field of Classification Search .................. 280/737, 280/741
See application file for complete search history.

(56) References Cited

U.S. PATENT DOCUMENTS

| | | | | |
|---|---|---|---|---|
| 1,913,015 A * | 6/1933 | Vodoz | | 102/327 |
| 5,348,344 A | 9/1994 | Blumenthal et al. | | |
| 6,068,292 A * | 5/2000 | Renz | | 280/737 |
| 6,076,468 A * | 6/2000 | DiGiacomo et al. | | 102/530 |
| 6,123,358 A | 9/2000 | Ryan et al. | | |
| 6,155,600 A | 12/2000 | Reynolds et al. | | |
| 6,976,704 B2 * | 12/2005 | Lewis et al. | | 280/741 |
| 6,997,475 B2 * | 2/2006 | Watase et al. | | 280/737 |
| 7,338,073 B2 * | 3/2008 | Nakayasu | | 280/737 |
| 7,431,335 B2 * | 10/2008 | Khandhadia et al. | | 280/737 |
| 7,806,436 B2 * | 10/2010 | Stevens et al. | | 280/741 |
| 2003/0137139 A1 * | 7/2003 | Iwai et al. | | 280/741 |
| 2004/0124619 A1 * | 7/2004 | Lewis et al. | | 280/741 |
| 2005/0035581 A1 * | 2/2005 | Katsuda et al. | | 280/741 |
| 2006/0055160 A1 * | 3/2006 | Cook et al. | | 280/741 |
| 2007/0052224 A1 * | 3/2007 | Nakayasu et al. | | 280/740 |
| 2008/0150266 A1 * | 6/2008 | Gmitter et al. | | 280/741 |
| 2009/0115174 A1 * | 5/2009 | Clark | | 280/741 |
| 2010/0007123 A1 * | 1/2010 | Cord et al. | | 280/741 |

* cited by examiner

Primary Examiner — Eric Culbreth
Assistant Examiner — Karen A Beck
(74) Attorney, Agent, or Firm — Harness, Dickey & Pierce, P.L.C.

(57) ABSTRACT

An inflator bottle adapted for controlled release of product gas to deploy an inflatable cushion and a method thereof is provided. The inflator bottle comprises a compartment filled with a combustible gas mixture having a partition that divides the compartment into a first region and a second region. Upon a crash event, an igniter on the inflator bottle ignites initiating combustion in the first region. Combustion propagates in the first region toward a nozzle building pressure in the first region sufficient to rupture a burst disk over the passage of the nozzle releasing product gas through the nozzle. The release of product gas through the nozzle draws combustible gas mixture from the second region flowing through the gas portal on the partition into the first region for combustion. The area of the gas portal between the regions is sized in relation to the size of the minimum area of the passage of the nozzle to supply the combustible gas mixture to the first region at a rate that maintains the flame front while preventing it from propagating out into the second region or out the nozzle until the remaining combustible gas mixture in the compartment is consumed.

24 Claims, 5 Drawing Sheets

INFLATOR BOTTLE FOR COMBUSTIBLE GAS MIXTURE

TECHNICAL FIELD

This invention relates to an inflator bottle for deploying an automotive airbag or the like. More particularly, this invention relates to such inflator bottle having a compartment containing a combustible gas mixture and comprising a partition that divides the compartment into a first region that confines the flame front and draws gas mixture from a second region after rupture of the burst disk, wherein the gas portal between the regions is sized to supply the gas mixture at a rate that maintains the flame front in the first region while preventing it from propagating into the second region or out through the nozzle.

BACKGROUND OF INVENTION

It is known in an automotive vehicle, in a collision event, to deploy an inflatable cushion, commonly referred to as an airbag, to protect vehicle occupants. Gas for deploying the airbag is supplied by an inflator bottle. One type of inflator bottle comprises a combustible gas mixture. A suitable combustible gas mixture comprises hydrogen, oxygen, argon, and helium gases. During deployment, the combustible gas mixture is ignited to form a product gas that is released through a nozzle into the airbag. Prior to deployment, a burst disk blocks a passage in the nozzle to contain the gas in the inflator bottle. During the early stages of ignition, the increase in pressure ruptures the burst disk to release the product gas. However, it is found that uncontrolled combustion of the combustible gas mixture requires a housing having thicker walls in order to prevent rupture due to the high pressures and the resultant improper deployment of the airbag due to the loss of inflation or product gas. Thicker housing walls undesirably add cost and weight to the inflator bottle. Also, uncontrolled combustion tends to increase the temperature of the product gas beyond limits for safe deployment in contact with the occupant. Moreover, in some applications, it may be desired to provide a more controlled release of product gas over an extended period of time as opposed to a rapid release such as would be produced by uncontrolled combustion of the combustible gas mixture.

Therefore, what is needed is an improved inflator bottle that is reliable to ignite the combustible gas mixture to produce an initial pressure effective to rupture the burst disk and release product gas through the nozzle, and thereafter to provide a controlled, sustained release of product gas at lower pressures and temperatures to deploy the airbag.

SUMMARY OF THE INVENTION

In accordance with one embodiment of the invention, an inflator bottle is adapted to release product gas and comprises a housing that defines a compartment. A combustible gas mixture fills the compartment and is combustible to form a product gas. A partition disposed in the housing divides the compartment into a first and second region. The partition includes a gas portal comprising one or more openings having a total portal area. The portal provides fluid communication between the first region and the second region. An igniter located in the first region is effective to initiate combustion of the combustible gas mixture producing product gas. A nozzle is located in the housing having a passage with a cross section area that communicates with the first region releasing the product gas. The gas portal is disposed intermediate the igniter and the nozzle, and the ratio of the total portal area of the gas portal to the minimum cross section area of the passage is less than or equal to about 8:1, preferably less than about 5:1.

In accordance with another embodiment of the invention, a method is provided for releasing a product gas. The method includes providing an inflator bottle comprising a compartment filled with a combustible gas mixture. The method further includes partitioning the compartment into a first region and a second region with a partition having a gas portal to provide fluid communication between the first and the second region. The method also includes igniting the combustible gas mixture at an ignition point within the first region to form a flame front that propagates through the first region at a flame speed and forms a product gas. The method yet further includes releasing the product gas through a nozzle that is spaced apart from the ignition point wherein the gas portal is disposed between the nozzle and the ignition point. As product gas is released through the nozzle, combustible gas mixture is drawn from the second region flowing through the gas portal into the first region at a rate effective to prevent the flame front from propagating into the second region or out the nozzle.

BRIEF DESCRIPTION OF THE DRAWINGS

This invention will be further described with reference to the accompanying drawings in which:

FIG. 2A is a cross section view of a portion of the inflator bottle in FIG. 2, showing details thereof;

DETAILED DESCRIPTION OF THE PREFERRED EMBODIMENTS

Figure 1:
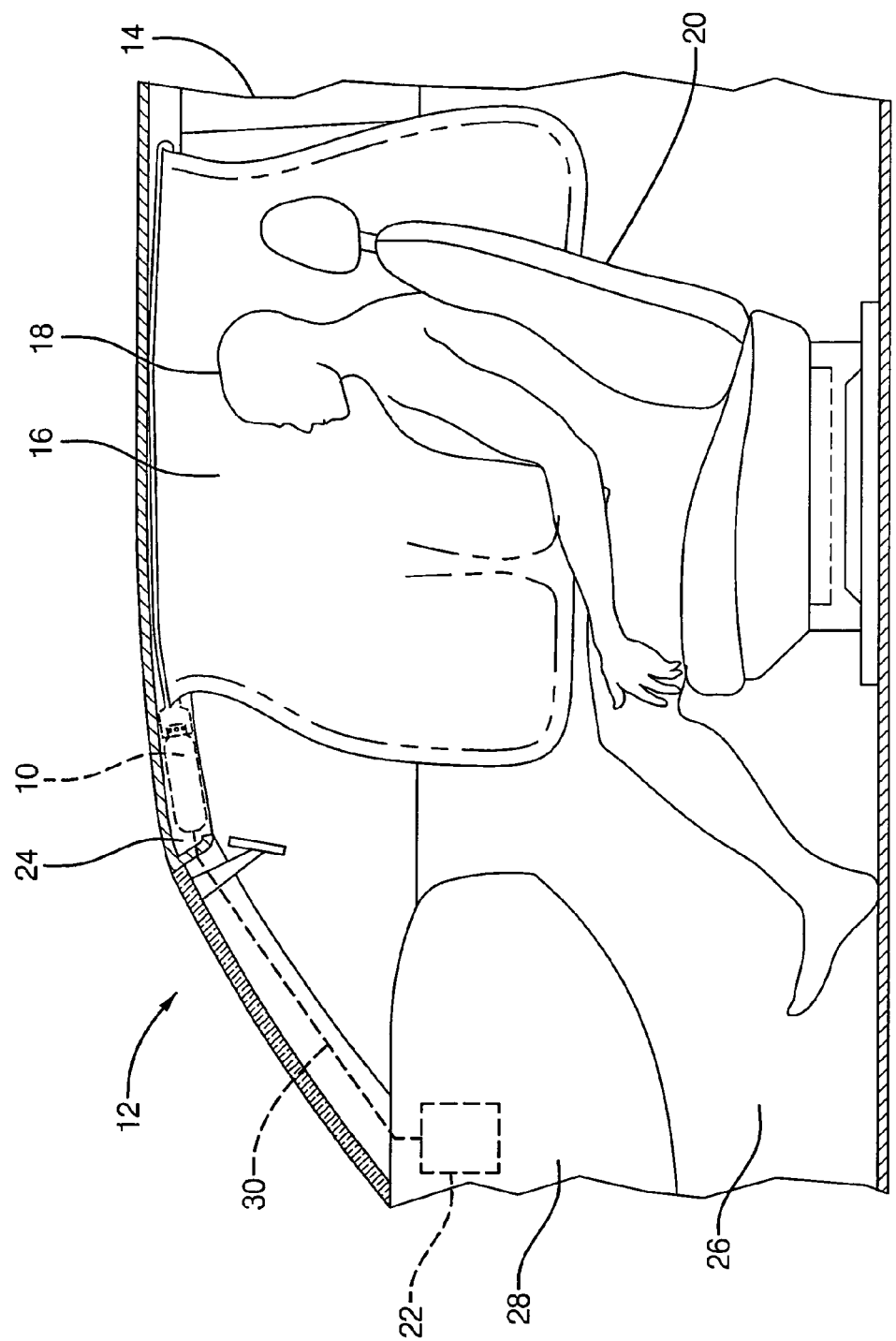
FIG. 1 is a view in cross section of a vehicle showing a airbag system that includes an inflator bottle in accordance with the present invention.

In accordance with a preferred embodiment, referring to FIG. 1, an inflator bottle 10 for releasing a product gas is employed in an airbag system 12 in a vehicle 14 to deploy an airbag or inflatable cushion 16 in the event of a collision to protect an adult occupant 18 sitting in a seat 20 in vehicle 14. A sensing diagnostic module (SDM) controller 22 is connected to inflator bottle 10. Inflator bottle 10 is in fluid communication with inflatable cushion 16. In the example shown in FIG. 1, airbag system 12 is located for side protection. In this arrangement, inflator bottle 10 and inflatable cushion 16 are mounted in a headliner 24 of a vehicle interior 26 and sensing diagnostic module controller 22 is mounted underneath an instrument panel 28 in the front of vehicle interior 26. In a collision event, controller 22 provides a signal 30 to inflator bottle 10 that ignites the combustible gas mixture in inflator bottle 10 and releases product gas to deploy inflatable cushion 16 protecting occupant 18. Alternately, the inflator bottle may be employed in a frontal airbag system that protects driver and passenger occupants in the event of frontal collisions.

Figure 2:
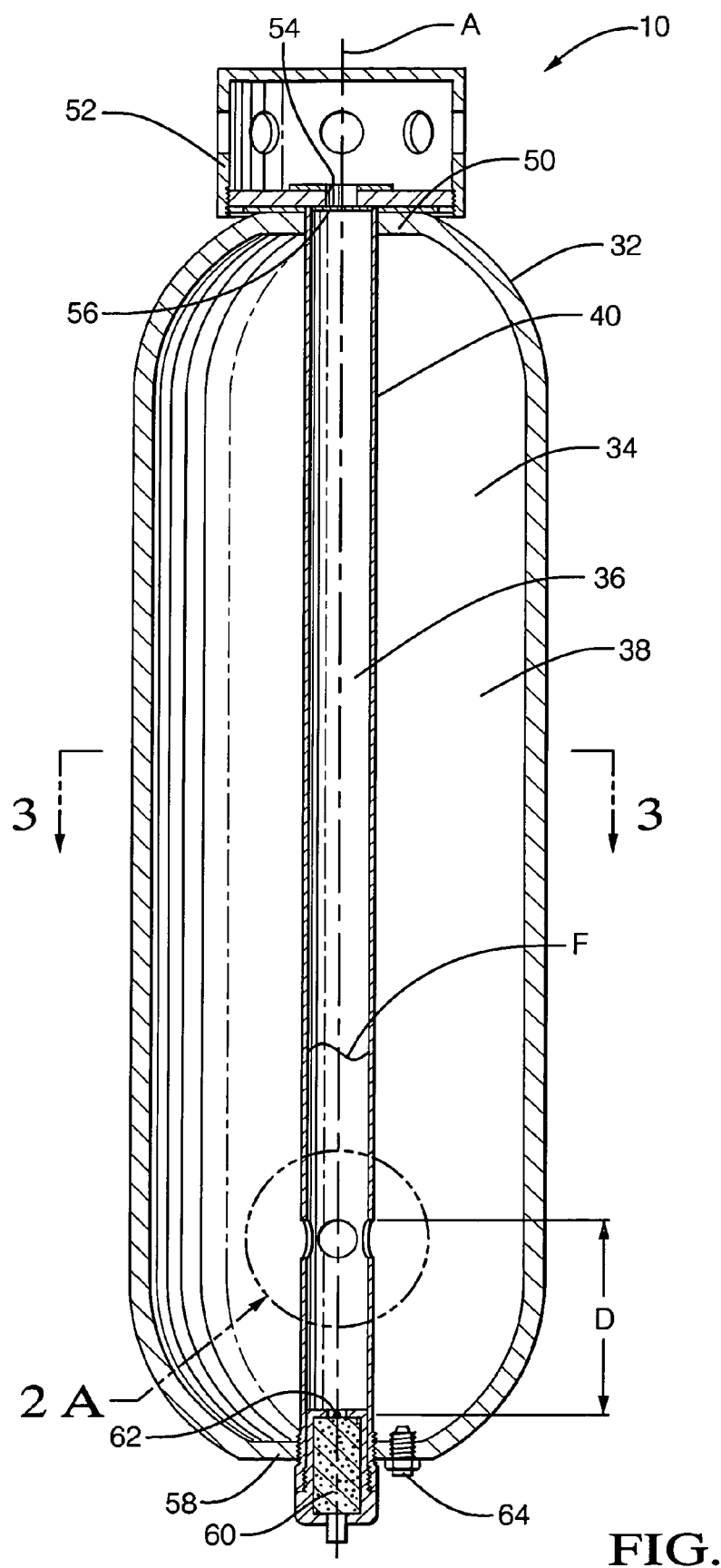
FIG. 2 shows a cross section view of an inflator bottle in accordance with the present invention.
Figure 2:
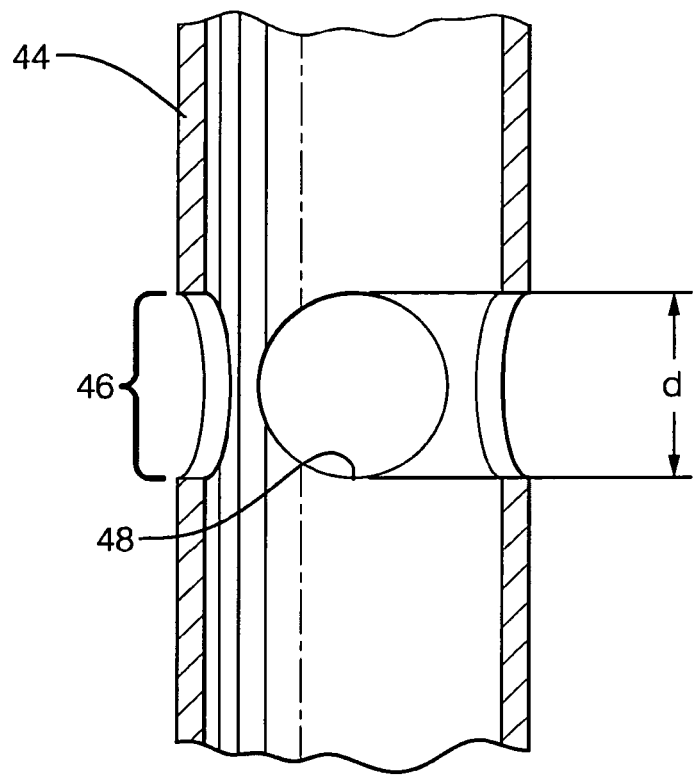
Figure 3:
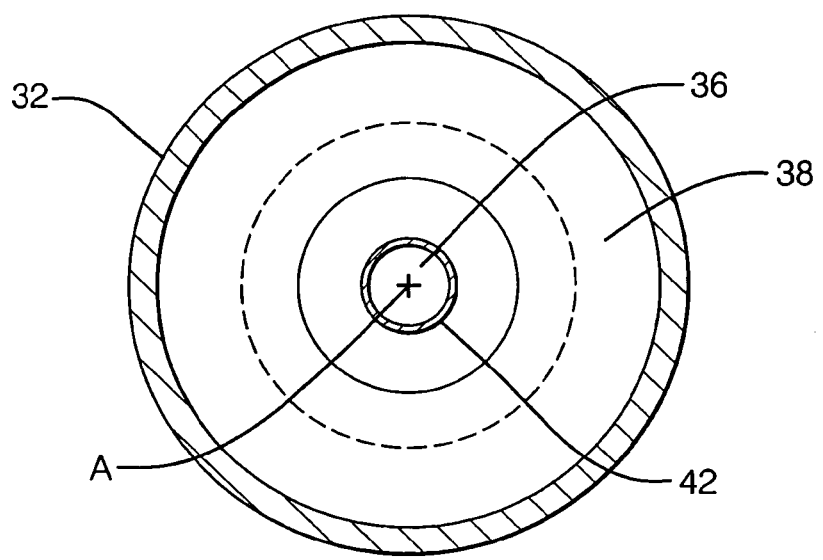
FIG. 3 shows a cross section view of the inflator bottle in FIG. 2, taken along line 3-3 in the direction of the arrows.

Referring to FIGS. 2-5, inflator bottle 10 includes a housing 32 that defines a compartment 34. Compartment 34 is divided into a first region 36 and a second region 38 by a partition 40, which in this embodiment is formed by a tube 42 having a wall 44 symmetrical about a longitudinal axis A. Alternately, partition 40 may be a wall that bisects compartment 34 and is attached to housing 32. First region 36 is an interior region defined by wall 44 and second region 38 is an exterior region surrounding wall 44 of tube 42 within housing 32. As shown in FIG. 2, first region 36 is smaller by volume than second region 38. Preferably, the volume in first region 36 is less than or equal to about 7% of combustible gas mixture contained in compartment 34 of inflator bottle 10. Housing 32 is preferably formed of a metal, but could be formed of polymeric or other material that is gas impermeable so the combustible gas mixture does not escape through the housing 32 of inflator bottle 10 before activation of the combustible gas mixture, yet capable of containing gas at high pressures and temperatures associated with combustion of the combustible gas mixture. Tube 42 is preferably formed of a metal, but could be formed of polymeric or other material that is gas impermeable so combustion of the combustible gas mixture is contained with first region 36 along with the pressures and temperatures associated with combustion of the combustible gas mixture. Tube 42 is welded to first axial end 50 of inflator bottle 10.

Partition 40 includes a gas portal 46 providing fluid communication between first region 36 and second region 38. Gas portal 46 comprises one or more openings 48. As shown in FIGS. 2-2A, openings 48 are circular having a diameter that is a maximum dimension d for the circular shape. Preferably, maximum dimension d is less than or equal to about 7 millimeters. As used herein, the total portal area of gas portal 46 refers to the sum of the areas of the openings 48 comprising gas portal 46.

A first axial end 50 comprises a nozzle 52 having an orifice or passage 54 disposed in first region 36 within tube 42. Tube 42 is welded to housing 32 at end 50. Nozzle 52 is welded to first axial end 50. Passage 54 communicates with first region 36 for releasing product gas from first region 36 of compartment 34. As used herein, the cross section area of passage 54 is defined by the minimum cross section area through which product gas flows to exit first region 36 out through nozzle 52. As shown in the example in FIG. 2, the minimum cross section area through which product gas flows to exit first region 36 through nozzle 52 is defined by the cross section area perpendicular to axis A of the space defining passage 54.

A burst disk 56 is disposed over passage 54 at end 50 within first region 36. Burst disk 56 is effective to contain combustible gas mixture in compartment 34 and prevent product gas from leaving first region 36 in compartment 34 through nozzle 52 until burst disk 56 is ruptured after combustion is initiated. First region 36 defines a volume of combustible gas mixture in an amount sufficient to produce product gas having a pressure effective to rupture burst disk 56. After combustion is initiated in first region 36, pressure builds in first region 36 to a level effective to rupture burst disk 56. Once burst disk 56 ruptures, product gas is released through passage 54 of nozzle 52. The amount of unreacted combustible gas mixture released with the product gas through passage 54 after rupture of burst disk 56 less than or equal to the volume of combustible gas mixture contained within first region 36.

A second axial end 58 comprises an igniter 60 disposed in first region 36 opposite nozzle 52 at first axial end 50. Igniter 60 is effective to initiate combustion of combustible gas mixture to produce product gas. A suitable igniter is a pyrotechnic igniter that generates sufficient heat to initiate a chemical reaction in the combustible gas mixture. Alternately, the igniter may produce an electric spark to ignite the combustible gas mixture. An ignition point 62 on igniter 60 is adapted to produce an electric spark to produce a flame front that initiates combustion of the combustible gas mixture. The flame front travels at a flame speed in first region 36 defined by tube 42. As combustion is initiated and confined to first region 36, a smaller igniter 60 that fits within the internal diameter area of tube 42 may be utilized. Tube 42 may be flared (not shown) at an end opposite first axial end 50 and fitted over igniter 60 during manufacturing.

Gas portal 46 is disposed on tube 42 intermediate nozzle 52 at end 50 and igniter 60 at end 58 within compartment 34. As shown in FIG. 2, gas portal 46 including the openings 48 in gas portal 46, have a distance D from the ignition point 62 of igniter 60 that is less than or equal to about 50% of the total length of tube 42. Preferably, the openings 48 of portal 46 are greater than or equal to about 3 millimeters from ignition point 62 to prevent igniter enclosure material about igniter 60 from blocking the openings 48 after igniter 60 ignites.

A combustible gas mixture is contained in compartment 34 of inflator bottle 10. Combustible gas mixture is combustible to form product gas. A suitable combustible gas mixture comprises hydrogen, oxygen, argon, and helium gases. The combustible gas mixture regulates the combustion reaction rate within first region 36 and generates product gas that exits nozzle 52 to fill inflatable cushion 16.

Housing 32 includes a fill port 64 to fill inflator bottle 10 with combustible gas mixture. As shown in FIG. 2, fill port 64 is in communication with second region 38 of inflator bottle 10. As combustible gas mixture is injected into inflator bottle 10 at fill port 64, combustible gas mixture fills second region 38 and flows into first region 36 through openings 48 of gas portal 46.

During operation, in the absence of a crash event, inflator bottle 10 in a non-active state with burst disk 56 containing combustible gas mixture within compartment 34. If a vehicle collision event occurs, controller 22 senses the collision event and sends signal 30 to activate inflator bottle 10. Signal 30 ignites igniter 60 to produce an electric spark in the combustible gas mixture that results in a flame front within first region 36. When igniter 60 ignites, combustion is confined to first region 36 by tube 42. The flame front propagates towards nozzle 52 combusting combustible gas mixture along the flame front producing product gas. As flame front proceeds past gas portal 46, combustion moves through openings 48 of gas portal 46 into second region 38 about openings 48. As combustion proceeds past gas portal 46 in first region 36 towards nozzle 52, the pressure in first region 36 builds to a level effective to rupture burst disk 56 blocking passage 54. As product gas is produced and pressure effective to rupture burst disk 56 in first region 36 is attained, burst disk 56 ruptures in response to the pressure releasing product gas through passage 54 and out nozzle 52.

Once burst disk 56 ruptures and product gas is released, combustible gas mixture in second region 38 of compartment 34 flows from second region 38 through openings 48 in gas portal 46 into first region 36. Any incidental combustion about openings 48 is also drawn into first region 36 and flame front settles at a location F in first region 36 intermediate nozzle 52 and gas portal 46. The flame front settles at location F as passage 54 in nozzle 52 in relation to openings 48 of gas portal 46 is sized and shaped to release product gas at a rate sufficient to draw combustible gas mixture from second region 38 through gas portal 46 into first region 36 at a rate greater than the flame speed of the flame front. The flame front is maintained in first region 36 intermediate nozzle 52 and gas portal 46 and product gas continues to release through passage 54 of nozzle 52 until the combustible gas mixture is consumed in compartment 34. Since the flame front is maintained at location F in first region 36, combustion is prevented from reaching second region 38 through openings 48 in gas portal 46 or propagating out through nozzle 52.

Figure 6:
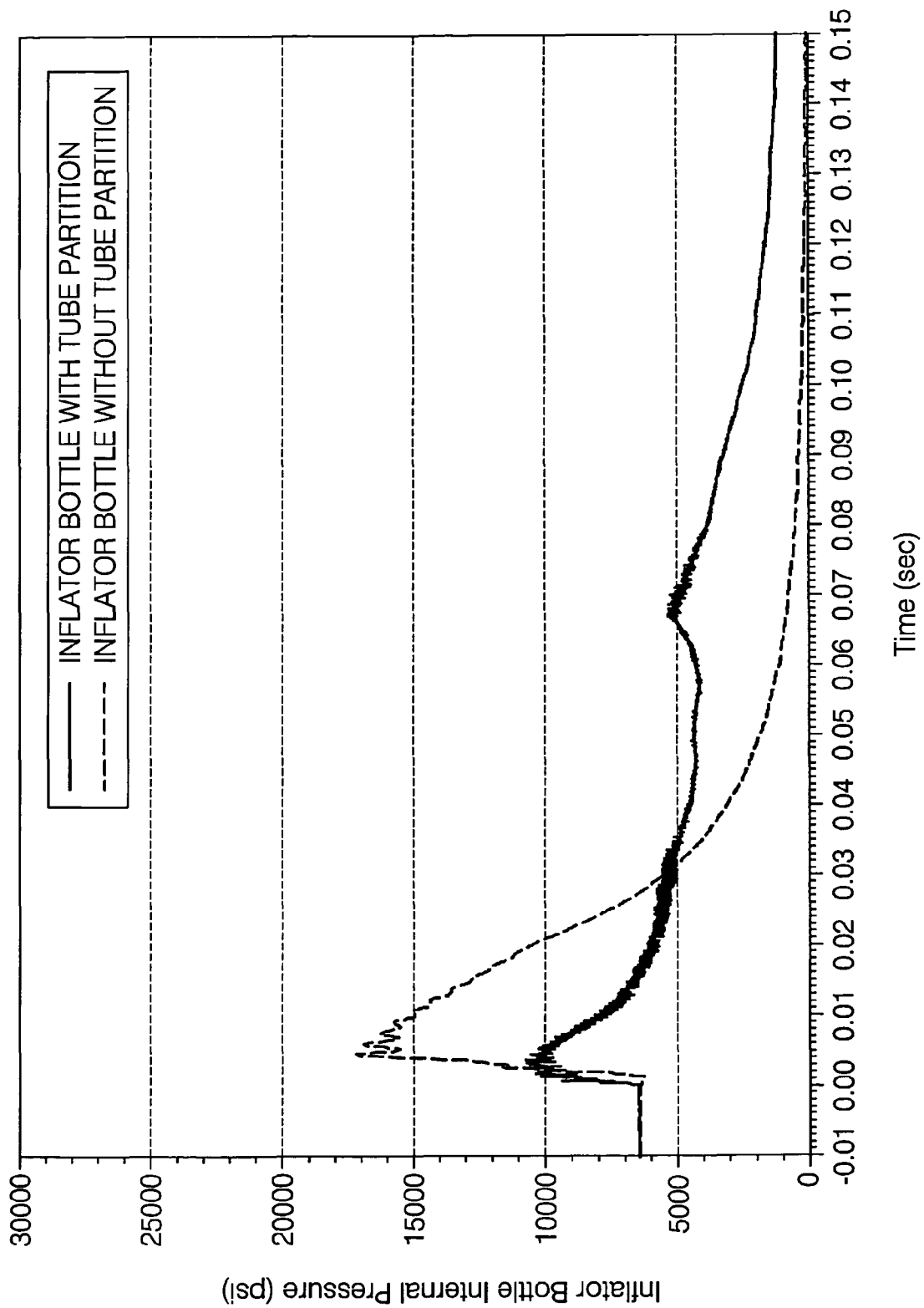
FIG. 6 shows a graph of inflator bottle internal pressure as a function of time.

FIG. 6 shows a graph contrasting the inflator bottle internal pressure (psi) over time (seconds) for an inflator bottle that includes a partition that is a tube according to the present invention and an inflator bottle of comparable size and shape with no tube partition. As shown in FIG. 6, the inflator bottle that includes the partition that is a tube contains the combustion within the first region and shows a lower maximum pressure over time versus an inflator bottle with no partition that contains the combustion within the housing.

While not limited to any particular theory, it is believed that, upon ignition of the combustible gas mixture by the igniter, a flame front is formed in the first region and propagates along the tube to a location F in the first region after the rupture of the burst disk. It is desired to maintain the flame front at location F in the first region and prevent it from propagating out of the nozzle at the first axial end or retreating out the gas portal on the partition and into the second region. For this purpose, the total portal area of the openings of the gas portal to the minimum cross section area of the passage in the nozzle is adjusted to have a ratio that is less than or equal to about 8:1. The ratio is preferably less than 5:1 and more preferably, between about 1.5:1 and 3:1. A ratio that is less than or equal to about 8:1 is effective to provide adequate flow of the combustible gas mixture from the second region into the first region and not so great as to allow large combustion reaction to occur outside of the first region. Moreover, the openings in the gas portal have a maximum dimension d that is less than or equal to about 7 millimeters to effectively allow the combustible gas mixture to flow from the second region into the first region at a velocity and a mass flow rate that is compatible with the minimum cross section area of the passage and not so great to allow combustion to occur outside of the first region. Preferably, the maximum dimension d is between about 3 and 7 millimeters. In general, it is preferred to locate the gas portal including the openings of the gas portal within distance D of the ignition point of the igniter that is less than or equal to about 50% of the total length of the partition in millimeters to establish an initial stable combustion and not so great to establish initial stable combustion that occurs outside of the first region into the second region or out through the nozzle after rupture of the burst disk. Additionally, the first region preferably contains a volume of combustible gas mixture that is less than or equal to about 7% of the combustible gas mixture in the compartment that is sufficient to establish and maintain combustion of the combustible gas mixture in the first region and not so great as to enable a large quantity of unreacted combustible gas mixture to be released along with product gas from the first region through the passage in the nozzle after rupture of the burst disk before combustion is fully established in the first region. Preferably, the volume in the first region is between about 4% and 7% of the total gas volume of the compartment.

Thus, this invention provides an inflator bottle that is reliable to provide a sustained release of product gas over a longer time interval. Containing combustion within the interior region surrounded by the wall of the tube allows for a more controlled combustion in the compartment, thus reducing the pressure build-up in the exterior region of the inflator bottle along the housing wall and lowering the combustion temperature of the inflator bottle. A lower maximum pressure within the compartment allows for a thinner housing wall to be utilized. A lower internal combustion temperature provides a higher safety factor for vehicle occupants in the interior of the vehicle following a crash event. Utilizing thinner housing walls means less material is needed to manufacture the inflator bottle with a decreased cost. An inflator bottle manufactured with less material has a lower overall weight. Lower inflator bottle weight contributes to a lower vehicle weight allowing for improved vehicle fuel economy desired by vehicle manufacturers. A lighter weight inflator bottle may provide additional packaging options to vehicle manufacturers when integrating the inflator bottle in an airbag system. An inflator bottle utilizing a partition that is a tube may allow a smaller igniter that fits within the inner diameter area of the tube to be utilized to initiate combustion that has less weight and a reduced cost.

Figure 4:
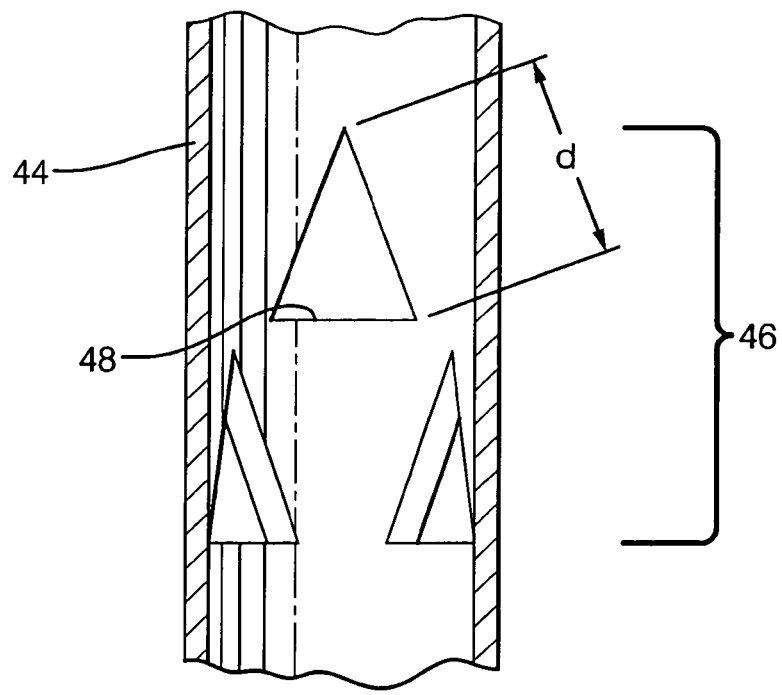
FIG. 4 is a cross section view of a portion of the inflator bottle in FIG. 2A, showing an alternate embodiment of a gas portal with openings of triangular shape.
Figure 5:
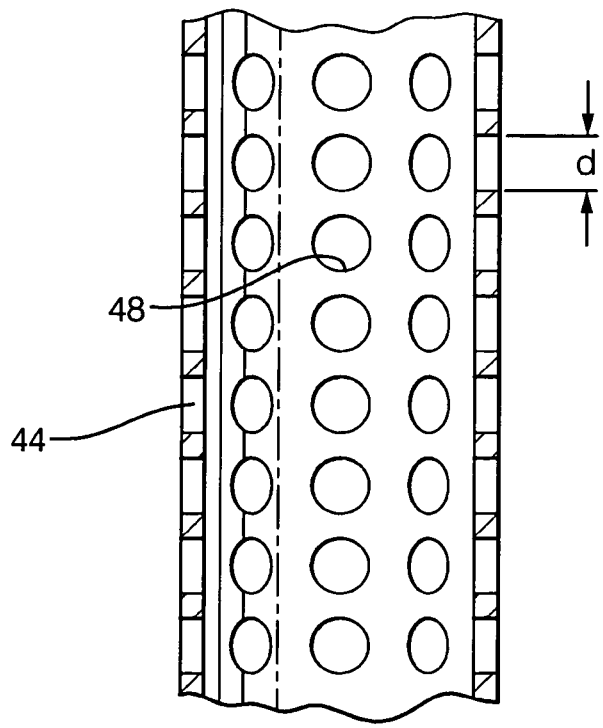
FIG. 5 is a cross section view of a portion of the inflator bottle in FIG. 2A, showing an alternate embodiment of a gas portal with numerous openings of circular shape.

In the embodiment shown in FIGS. 2-2A, openings 48 in gas portal 46 are circles. The embodiment in FIG. 2 also shows four circular openings 48 in gas portal 46. In an alternate embodiment as shown in FIG. 4, a tube 42 may comprise openings 48 in gas portal 46 of triangular shape that have maximum dimension d. In an alternate embodiment shown in FIG. 5, gas portal 46 of tube 42 is perforated with numerous openings of circular shape that cooperate to have a total portal area. Alternately, the portal may comprise any number of openings 48 comprising any suitable shape that allows sufficient gas flow into the first region to provide combustible gas mixture for the flame front at a rate effective to maintain the flame front within first region 36 that is governed by the relationship of the ratio of the total portal area of the portal 46 to the minimum cross section area of passage 54 is less than or equal to about 8:1.

While this invention has been described in terms of the preferred embodiments thereof, it is not intended to be so limited, but rather only to the extent set forth in the claims that follow.

We claim:

1. An inflator bottle for releasing a product gas, said inflator bottle comprising:
    a housing defining a compartment;
    a partition disposed within the housing and dividing the compartment into a first region and a second region, said partition including a gas portal providing fluid communication between the first region and the second region, said gas portal comprising one or more openings having a total portal area;
    a combustible gas mixture within the first region and the second region, said combustible gas mixture being combustible to form a product gas;
    an igniter disposed within the first region, and effective to initiate combustion of the combustible gas mixture to produce product gas;
    a nozzle disposed in the housing, and having a passage communicating with the first region for releasing the product gas, said passage having a minimum cross section area; and
    wherein said gas portal is disposed intermediate the igniter and the nozzle, and a ratio of the total portal area to the minimum cross section area of the passage is less than or equal to about 8:1.

2. The inflator bottle of claim 1, wherein the first region contains a volume that is less than or equal to about 7% of the combustible gas mixture contained within the compartment.

3. The inflator bottle of claim 1, wherein each of said openings has a maximum dimension that is less than or equal to about 7 millimeters.

4. The inflator bottle of claim 1, wherein a distance between the openings of the gas portal and the igniter is less than or equal to about 50% of the total length of the partition.

5. The inflator bottle of claim 1, wherein the partition comprises a tube having a longitudinal axis and including a wall symmetrical about said axis and extending from a first longitudinal end of the housing to a second opposite longitudinal end of the housing, wherein the first region is an interior region surrounded by the wall and the second region is an exterior region about the wall within the housing.

6. The inflator bottle of claim 5, wherein the tube includes a first axial end attached to said first longitudinal end and a second axial end attached to said second longitudinal end, said nozzle being disposed at the first axial end and said igniter being disposed at said second axial end, said tube being unobstructed between said axial ends.

7. The inflator bottle of claim 6, wherein the gas portal is disposed intermediate the first axial end and the second axial end such that combustion initiated by the igniter proceeds progressively within the first region to the nozzle.

8. The inflatable bottle of claim 1, wherein the inflator bottle includes a burst disk for blocking flow of product gas through the passage and rupturable in response to combustion of said combustible gas mixture to allow release of product gas through the passage.

9. The inflatable bottle of claim 8, wherein the first region contains a volume of the combustible gas mixture in an amount sufficient to produce product gas having a pressure which is alone effective to rupture the burst disk.

10. The inflator bottle of claim 1, wherein the igniter is a pyrotechnic igniter or an igniter adapted to produce an electrical spark.

11. The inflator bottle of claim 5, wherein the igniter produces a flame front within the tube that travels at a flame speed, wherein the passage of the nozzle is sized and shaped to release product gas at a rate sufficient to draw in combustible gas mixture from the second region through the gas portal into the first region at a rate greater than the flame speed such that upon release of product gas through the passage, combustion occurs only in the first region.

12. The inflatable bottle of claim 1, wherein the housing includes a fill port to fill the inflator bottle with combustible gas mixture, wherein the fill port communicates with the second region.

13. A method of releasing a product gas, said method comprising:
providing an inflator bottle comprising a compartment containing a combustible gas mixture;
partitioning the compartment into a first region and a second region with a partition having a gas portal to provide fluid communication between the first region and the second region wherein the combustion gas mixture being in the first region and second region;
igniting the combustible gas mixture at an ignition point within the first region to form a flame front that propagates through the first region at a flame speed and forms a product gas;
releasing the product gas through a nozzle spaced apart from the ignition point, wherein the gas portal is disposed between the nozzle and the ignition point; and
wherein the release of product gas through the nozzle draws combustible gas mixture from the second region through the gas portal into the first region at a rate effective to prevent the flame front from propagating into the second region or out through the nozzle such that combustion occurs only in the first region.

14. The method of releasing product gas of claim 13, wherein the nozzle comprises a passage having a cross section area and wherein the gas portal comprises openings having a total portal area, and the ratio of the total portal area to the minimum cross section area of the passage is less than or equal to 8:1.

15. The method of releasing product gas of claim 14, wherein each of said openings has a maximum dimension that is less or equal to about 7 millimeters.

16. The method of releasing product gas of claim 14, wherein a distance between the openings of the gas portal and the igniter is less than or equal to about 50% of the total length of the partition.

17. The method of releasing product gas of claim 14, wherein the first region contains a volume that is less than or equal to about 7% of the combustible gas mixture contained within the compartment.

18. The method of releasing a product gas of claim 14, wherein the nozzle further comprises a burst disk blocking the passage, and further wherein ignition of the combustible gas mixture in the first region produces a product gas having a pressure that is alone effective to rupture the burst disk and release the product gas through the passage.

19. The method of releasing a product gas of claim 13, further comprising maintaining the flame front between the nozzle and the gas portal to prevent combustion from reaching the second region through the gas portal.

20. The inflator bottle of claim 13, wherein the partition extends from a first longitudinal end of the bottle to a second opposite longitudinal end of the bottle.

21. The method of releasing a product gas of claim 20, wherein the combustible gas drawn from the second region through the gas portal flows within the first region directly to the passage of the nozzle.

22. The inflatable bottle of claim 6, wherein the passage of the nozzle is in direct fluid communication with the gas portal through the first region.

23. The inflatable bottle of claim 11, wherein the passage is sized and shaped to release product gas at a rate sufficient to have the flame front positioned between the passage and the gas portal.

24. The inflatable bottle of claim 1, wherein the passage defines a passageway from the first region of the compartment into the nozzle.

* * * * *